(12) United States Patent
Mine et al.

(10) Patent No.: US 10,623,593 B2
(45) Date of Patent: Apr. 14, 2020

(54) METHOD OF PRODUCING OUTPUT PRODUCT BY OUTPUTTING APPROPRIATE CODE CORRESPONDING TO OUTPUT CONDITION, AND STORAGE MEDIUM STORING CODE CONVERSION PROGRAM

(71) Applicant: SEIKO EPSON CORPORATION, Tokyo (JP)

(72) Inventors: Haruki Mine, Nagano (JP); Kenji Sakuda, Nagano (JP); Kikuo Ueno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/250,029

(22) Filed: Jan. 17, 2019

(65) Prior Publication Data

US 2019/0230234 A1 Jul. 25, 2019

(30) Foreign Application Priority Data

Jan. 19, 2018 (JP) .................. 2018-007033

(51) Int. Cl.
| | |
|---|---|
| H04N 1/00 | (2006.01) |
| G06F 3/12 | (2006.01) |
| H04N 1/32 | (2006.01) |
| H04N 1/23 | (2006.01) |
| G06K 19/06 | (2006.01) |

(52) U.S. Cl.
CPC ....... *H04N 1/00326* (2013.01); *G06F 3/1208* (2013.01); *G06F 3/1256* (2013.01); *H04N 1/0044* (2013.01); *H04N 1/00477* (2013.01); *H04N 1/2323* (2013.01); *H04N 1/2338* (2013.01); *H04N 1/2346* (2013.01); *H04N 1/2353* (2013.01); *H04N 1/32133* (2013.01); *H04N 1/32529* (2013.01); *H04N 1/32689* (2013.01); *G06K 19/06037* (2013.01); *G06K 2019/06253* (2013.01); *H04N 1/2392* (2013.01); *H04N 1/32358* (2013.01); *H04N 2201/0082* (2013.01); *H04N 2201/0089* (2013.01)

(58) Field of Classification Search
CPC .......................... H04N 1/32101–32352; H04N 2201/3201–3284; G06K 19/06–06178; G06K 2019/06215–06262
See application file for complete search history.

(56) References Cited

U.S. PATENT DOCUMENTS

| | | | | |
|---|---|---|---|---|
| 6,726,104 B2 * | 4/2004 | Schuessler | ............. | G06K 1/121 235/462.01 |
| 7,952,750 B2 * | 5/2011 | Arakawa | ............ | H04N 1/32203 358/1.8 |
| 8,186,594 B2 * | 5/2012 | Uzawa | ................... | G06K 1/121 235/375 |

(Continued)

FOREIGN PATENT DOCUMENTS

JP 2007-034620 A 2/2007

*Primary Examiner* — Scott A Rogers
(74) *Attorney, Agent, or Firm* — Global IP Counselors, LLP

(57) ABSTRACT

An output product producing method includes acquiring output information, specifying an output condition for an output section, converting the output information into a code having an error-correction amount corresponding to the output condition, and causing the output section to output an output product including the code under the output condition.

9 Claims, 4 Drawing Sheets

(56) References Cited

U.S. PATENT DOCUMENTS

| | | | |
|---|---|---|---|
| 8,482,805 B2* | 7/2013 | Matsuya | H04N 1/00002 |
| | | | 358/1.2 |
| 8,614,833 B2 | 12/2013 | Oda et al. | |
| 10,282,648 B2* | 5/2019 | Friedman | G06K 19/06037 |
| 2007/0019222 A1 | 1/2007 | Oda et al. | |
| 2014/0285855 A1* | 9/2014 | Capobianco | B41M 3/14 |
| | | | 358/3.28 |
| 2015/0029559 A1* | 1/2015 | Kifuku | G06K 1/121 |
| | | | 358/3.28 |

* cited by examiner

METHOD OF PRODUCING OUTPUT PRODUCT BY OUTPUTTING APPROPRIATE CODE CORRESPONDING TO OUTPUT CONDITION, AND STORAGE MEDIUM STORING CODE CONVERSION PROGRAM

CROSS REFERENCES TO RELATED APPLICATIONS

The present invention contains subject matter related to Japanese Patent Application No. 2018-007033 filed in the Japanese Patent Office on Jan. 19, 2018, the entire contents of which are incorporated herein by reference.

BACKGROUND

1. Technical Field

The present invention relates to a method of producing an output product and a storage medium storing a code conversion program.

2. Related Art

Known codes such as two-dimensional codes and one-dimensional codes provide various kinds of information in predetermined display formats. In reading such displayed codes, reading errors may occur, and techniques for appropriately reading such codes are developed. For example, JP-A-2007-34620 discloses a technique in which in printing a two-dimensional code by a printer, when a toner-saving mode is set, toner-saving processing to the code is selectively disabled.

In another example, in displaying information in various displaying methods such as displaying information as print products or displaying information on displays, in some cases, it is impossible to change the display quality in some part of the displays. Furthermore, even though a device is not in a toner-saving mode, reading errors may occur.

SUMMARY

An advantage of some aspects of the invention is that an appropriate code that corresponds to an output condition can be output.

According to an aspect of the invention, an output product producing method includes acquiring output information, specifying an output condition for an output section, converting the output information into a code having an error-correction amount corresponding to the output condition, and causing the output section to output an output product including the code under the output condition.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described according to the following order.
1. Configuration of Code Conversion Apparatus
2. Print Processing
3. Other Embodiments

1. Configuration of Code Conversion Apparatus

Figure 1:
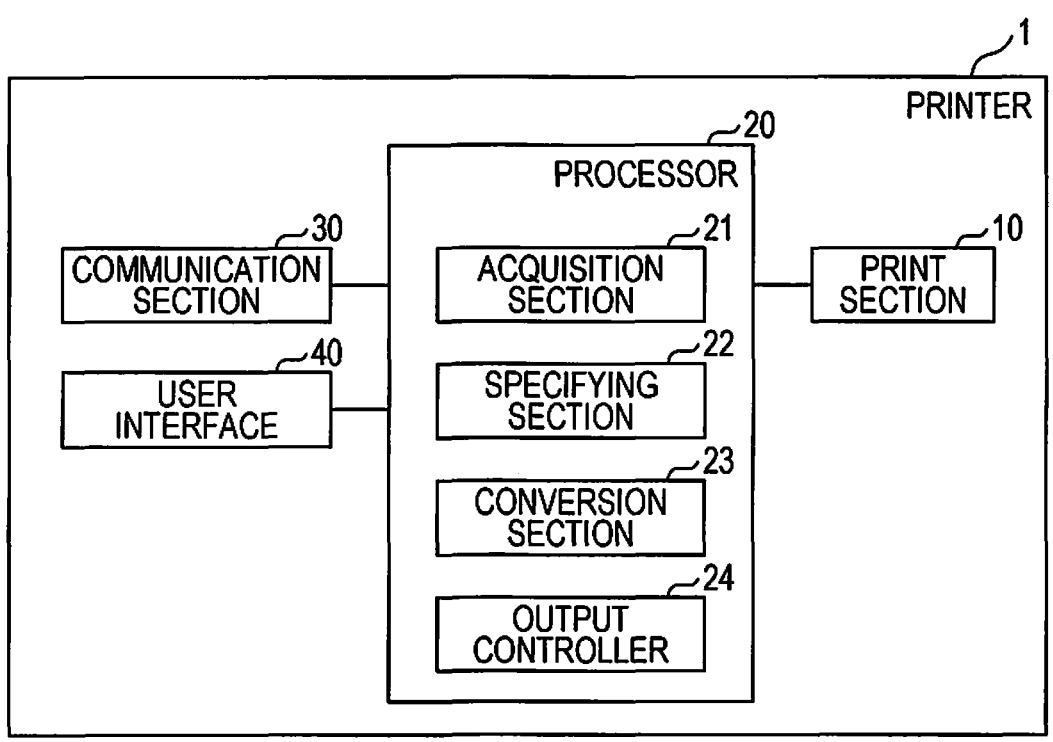
FIG. 1 is a block diagram illustrating a configuration of a printer.

FIG. 1 is a block diagram illustrating a configuration of a printer 1 that serves as a code conversion apparatus according to an embodiment of the invention. The printer 1 includes a print section 10, a processor 20, a communication section 30, and a user interface 40.

The print section 10 includes an actuator, a sensor, a drive circuit, and mechanical components for performing printing onto various print media by a known printing method such as an ink jet method, an electrophotographic method, or the like. The print section 10 also includes a sheet feed tray on which a print medium to be printed is mounted. Although any print media and any recording materials may be used, in this embodiment, the print section 10 performs printing in an ink jet method, and coated paper and uncoated paper can be used as print media.

In this description, the coated paper is a print medium on which a coating is applied to prevent or reduce ink bleeding, whereas no coating is applied to the uncoated paper, which may be referred to as plain paper or fine quality paper. It should be noted that the print media are not limited to these types of paper, and for example, an OHP sheet may be used.

The print section 10 also includes a section for attaching an ink tank (not illustrated), and the print section 10 can perform printing by using an ink supplied from the ink tank attached to the attachment section. In this embodiment, a user can select a genuine ink tank filled with genuine ink or a non-genuine ink tank willed with non-genuine ink. The print section 10 can determine whether or not a genuine ink is used by using a memory chip attached to the ink tank or the like.

The communication section 30 includes various communication interfaces for communicating with an external device by wired or wireless communication. The communication section 30 also includes an interface for communicating with various removable storage devices attached to the printer 1. The user interface 40 includes a touch panel display (hereinafter, simply referred to as a display) and a key input section (not illustrated). The display includes a display panel for displaying various kinds of information under the control of the processor 20 and a touch detection panel that is disposed on the display panel. The display detects, in a known method such as a capacitive method, a resistance film method, an optical method, or the like, a touch operation made by a pointing object such as a human finger. The display outputs information about the touch operation, for example, a touch starting position, coordinates of a touch end position, or the like to the processor 20. The display serves as a display section and an operation input section.

The processor 20 includes a central processing unit (CPU), a read-only memory (ROM), a random access memory (RAM), and a nonvolatile memory (not illustrated). The CPU can execute a control program (including a code conversion program) that is stored in the ROM or the nonvolatile memory by using the RAM or the nonvolatile memory. The control program causes the processor 20 to implement a function for controlling individual sections in the printer 1. For example, according to the control program, the processor 20 causes the user interface 40 to display various kinds of information on the display and detect a content of a touch operation made with respect to the display. The processor 20 may use an application-specific integrated circuit (ASIC) instead of the CPU, or the CPU and an ASIC may cooperate with each other.

The processor 20 can cause, according to the control program, the communication section 30 to acquire information from an external device or a removable storage device that is connected to the communication section 30, or output information to an external device or a removable storage device. Furthermore, the processor 20 can cause the print section 10 to perform printing based on print data stored in an external device or a removable storage device.

The processor 20 according to the embodiment has a function of inserting a two-dimensional code into a print target indicated by print data and causing the print section 10 to implement printing. To implement the function, the processor 20 includes an acquisition section 21, a specifying section 22, a conversion section 23, and an output controller 24.

The acquisition section 21 is a program module for causing the processor 20 to implement a function of acquiring output information. The output information is expressed as a two-dimensional code and is expressed by numerals, characters, or the like. The output information may be acquired from various devices. In this embodiment, output information can be acquired from an external device or a removable storage device that is connected to the communication section 30. By the function of the acquisition section 21, the processor 20 can cause the user interface 40 to display a list of files stored in an external device or a removable storage device that is connected to the communication section 30.

A user can operate the user interface 40 to select a file that indicates output information to be coded as a two-dimensional code and a file that indicates a document to be printed. The processor 20 acquires these files via the communication section 30 and stores the files, for example, in a RAM (not illustrated). With this operation, the print data into which the two-dimensional code is to be inserted and the output information to be coded as the two-dimensional code are acquired.

The specifying section 22 is a program module for causing the processor 20 to implement a function of specifying an output condition for an output section. In this embodiment, when printing is selected as an outputting method, the print section 10 corresponds to an output section, and the printing and a print condition in the print section 10 correspond to the output conditions. The print conditions according to the embodiment include the type (uncoated paper or coated paper) of print medium and the type (genuine ink or non-genuine ink) of ink. Information about the print medium type and the ink type is stored as the print conditions, for example, in a nonvolatile memory (not illustrated).

The processor 20 can specify a print condition based on the information stored in the nonvolatile memory or the like by the function of the specifying section 22. The print condition can be changed based on a user's instruction or an output from the print section 10. Specifically, a user can operate the user interface 40 to specify the print medium type, and the processor 20 updates the print condition with the information indicating the specified print medium. The print section 10 can determine whether or not an attached ink tank is genuine, and the processor 20 updates a print condition with the information. If the ink tank is genuine, the processor 20 updates the print condition with the information indicating that a genuine ink is to be used, and if the ink tank is non-genuine, updates the print condition with the information indicating that a non-genuine ink is to be used. It should be noted that the print section 10 may specify the print medium type by using a sensor or the like and acquire the information as a print condition, or a user may specify the ink type and the print section 10 may acquire the information as a print condition.

The conversion section 23 is a program module for causing the processor 20 to implement a function of converting output information into a code that has an error-correction amount that corresponds to an output condition. Specifically, the processor 20 converts, by the function of the conversion section 23, output information acquired by the function of the acquisition section 21 into a two-dimensional code. In this processing, the processor 20 adds error-correction information to output information and generates a two-dimensional code. The processor 20 adjusts an error-correction amount that is an information amount corresponding to the error correction information based on a print condition. In other words, the processor 20 adjusts an error correction capability based on a print condition.

Specifically, the processor 20 adjusts an error-correction amount such that the error-correction amount decreases as the print quality increases. The print quality can be evaluated by various factors such as resolution, print speed, the type of image processing, or the like. In this embodiment, it is assumed that the smaller the bleeding of ink on a printed medium, the higher the print quality is. Since the degree of bleeding varies depending on print conditions, in this embodiment, error correction capabilities are associated with respective print conditions. The correspondence relation information is stored, for example, in a nonvolatile memory (not illustrated) in the printer 1.

Table 1 shows an example correspondence relationship between print conditions and error correction capabilities.

TABLE 1

|  | GENUINE INK | NON-GENUINE INK |
| --- | --- | --- |
| UNCOATED PAPER | C2: LEVEL Q (ABOUT 25% RESTORABLE) | C4: LEVEL H (ABOUT 30% RESTORABLE) |
| COATED PAPER | C1: LEVEL M (ABOUT 15% RESTORABLE) | C3: LEVEL Q (ABOUT 25% RESTORABLE) |

Table 1 shows an example correspondence relationship between print conditions C1 to C4 of the printer 1 and error correction capabilities of a QR code (registered trademark) respectively. Although the two-dimensional code is not limited to the QR code, in this specification, embodiments of the QR code will be described below.

A QR code has predetermined levels of error correction capability: level L, level M, level Q, and level H. A QR code is generated by adding a codeword for error correction to a data codeword that corresponds to output information and combining these codewords. In this processing, the information amount of the error-correction codeword is variable, and as the information amount of the error-correction codeword increases, the error-correction capability (restoration rate for all codewords) increases.

For example, the error-correction capability is about 7% at the level L, the error-correction capability is about 15% at the level M, the error-correction capability is about 25% at the level Q, and the error-correction capability is about 30% at the level H. The error-correction capability is a proportion of words that can be restored when a codeword is erroneously read, and the numerical value that corresponds to the error-correction capability can be regarded as the error-correction amount.

In this embodiment, the error-correction amount for a print condition for high-quality printing is smaller than that for low-quality printing. For example, the print quality of coated paper is higher than that of uncoated paper. The print condition C1 in Table 1 is for printing on coated paper with genuine ink, and the print condition C2 is for printing on uncoated paper with genuine ink. The error-correction amount for the print condition C1 is smaller than that for the print condition C2. The print condition C3 is for printing on coated paper with non-genuine ink, and the print condition C4 is for printing on uncoated paper with non-genuine ink. The error-correction amount for the print condition C3 is smaller than that for the print condition C4.

A larger error-correction amount increases the information amount and, accordingly, the size of a two-dimensional code increases. In this embodiment, however, when a print condition indicates printing on coated paper, a conversion is performed with a smaller error-correction amount than that for printing on uncoated paper. Accordingly, in this embodiment, when print quality is high and errors are less likely to occur in reading a print product, it can be prevented that an unnecessarily large two-dimensional code with an unnecessarily large error-correction amount is printed.

Furthermore, regarding the type of ink, printing with genuine ink provides higher print quality than printing with non-genuine ink. The print condition C1 in Table 1 is for printing on coated paper with genuine ink, and the print condition C3 is for printing on coated paper with non-genuine ink. The error-correction amount for the print condition C1 is smaller than that for the print condition C3. The print condition C2 is for printing on uncoated paper with genuine ink. The print condition C4 is for printing on uncoated paper with non-genuine ink. The error-correction amount for the print condition C2 is smaller than that for the print condition C4.

As described above, in this embodiment, when a print condition indicates printing with genuine ink, a conversion is performed with an error-correction amount smaller than that in printing with non-genuine ink. Accordingly, in this embodiment, when print quality is high and errors are less likely to occur in reading a print product, it can be prevented that an unnecessarily large two-dimensional code with an unnecessarily large error-correction amount is printed.

As described above, in this embodiment, the print conditions are associated with respective corresponding error-correction amounts. The error-correction amount adjustment in accordance with the print quality may be performed for all print conditions or some of the print conditions. For example, in the case of the print conditions C1 and C2, the error-correction amounts in printing on coated paper are smaller than those in printing on uncoated paper, however, in the case of the print condition C3 and C4, the error-correction amounts in printing on coated paper may not be smaller than those in printing on uncoated paper. In such a case, regarding the print conditions C1 and C2, the error-correction amounts in printing on coated paper are similarly smaller than those in printing on uncoated paper, and accordingly, the technical thought of the embodiment applies to this case. The same applies to other cases, for example, display conditions for a display.

The output controller 24 is a program module for causing the processor 20 to implement a function of outputting a code. The processor 20 inserts, by the function of the output controller 24, a QR code into a print target that is indicated by print data acquired in the acquisition section 21 and draws the print target in which the QR code is being inserted. The processor 20 causes the print section 10 based on the drawing result to print a print product in which the QR code is inserted.

This configuration enables printing of a print product that includes a QR code having an error-correction amount (error-correction capability) corresponding to a print condition. The error-correction amounts are preset to correspond to print conditions. In this embodiment, the error-correction amounts are adjusted so as to be reduced for high-quality printing as compared with the error-correction amounts for low-quality printing. Accordingly, when the print quality is high, it can be prevented that the error-correction amount is unnecessarily increased and the size of the code becomes large, whereas when the print quality is low, it can be prevented that the error-correction amount is unnecessarily reduced and reading errors frequently occur. With the processing, an appropriate code corresponding to an output condition can be output and a print product that includes the code can be produced as an output product.

2. Print Processing

Figure 2:
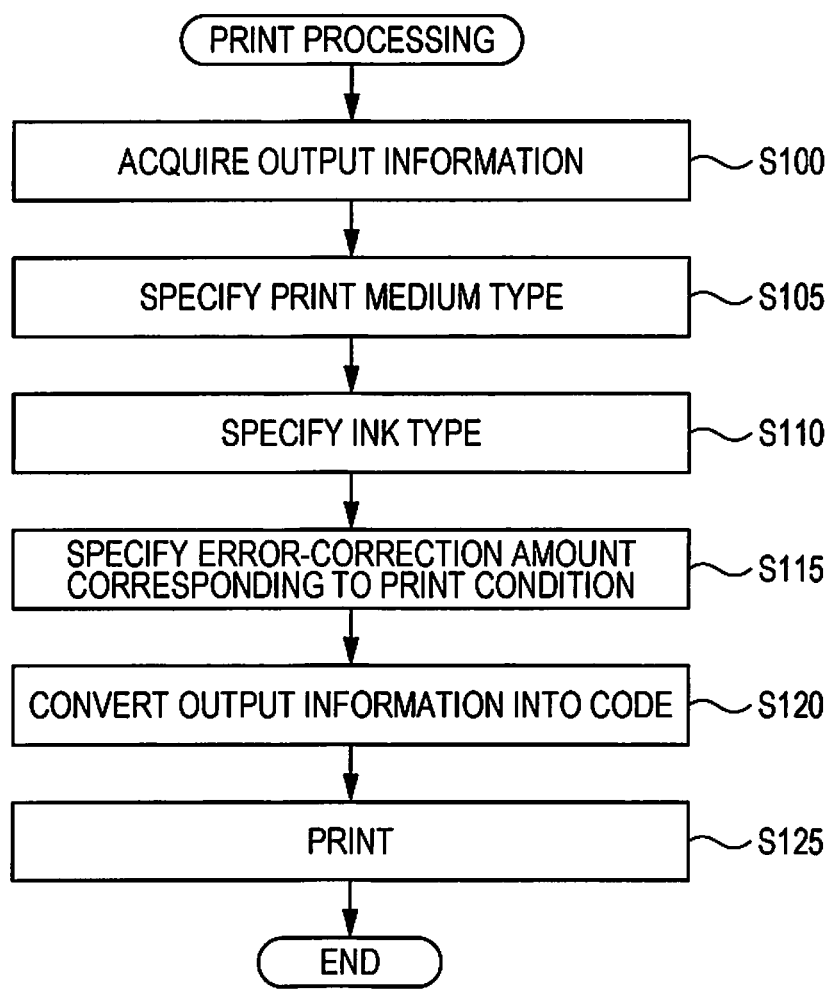
FIG. 2 is a flowchart of print processing.

Next, print processing to be performed in the printer 1 will be described. After a user's operation on the user interface 40 to start printing a document that contains an inserted QR code, the processor 20 performs the print processing illustrated in FIG. 2. In the print processing, the processor 20 acquires output information by the function of the acquisition section 21 (step S100). Specifically, a user operates the user interface 40 and selects a file that indicates output information to be coded as a two-dimensional code. The processor 20 acquires the file via the communication section 30 based on the output from the user interface 40. Then, the processor 20 records the output information that is described in the file in a RAM or the like.

The processor 20 specifies the type of print medium by the function of the specifying section 22 (step S105). Specifically, the user operates the user interface 40 to specify the type of print medium to be used, the medium being stored in a tray, and the processor 20 updates the print condition with the information that indicates the specified print medium. It should be noted that if there is no change from the saved print conditions, the user's operation for specifying the print medium type may be omitted. In any case, the processor 20 specifies the print medium type by referring to, for example, a nonvolatile memory that the stores print conditions.

The processor 20 specifies the ink type by the function of the specifying section 22 (step S110). Specifically, when an ink tank is attached, the print section 10 determines whether the attached ink tank is a genuine ink tank or a non-genuine ink tank. When the attached ink tank is a genuine ink tank, the print section 10 updates the print condition with the information that indicates genuine ink. When the attached ink tank is a non-genuine ink tank, the print section 10 updates the print condition with the information that indicates non-genuine ink. The processor 20 refers to, for example, a nonvolatile memory that stores the print conditions and specifies the type of ink.

Then, the processor 20 specifies an error-correction amount that corresponds to the print condition by the function of the conversion section 23 (step S115). Specifically, the processor 20 refers to information that indicates a correspondence relationship that is stored, for example, in a nonvolatile memory, specifies the error-correction capability that is associated with the print medium type and the ink type that have been acquired in steps S105 and S110, and acquires the error-correction capability as an error-correction amount. For example, when the print condition is the print condition C1 in Table 1, the processor 20 acquires the level M of the error-correction capability as the error-correction amount. When the print condition is the print condition C2 in Table 1, the processor 20 acquires the level Q of the error-correction capability as the error-correction amount.

The processor 20 converts the output information into a code by the function of the conversion section 23 (step S120). Specifically, the processor 20 adds the information about the error-correction amount acquired in step S115 to the output information acquired in step S100 and generates a QR code based on the added information.

Then, the processor 20 performs printing (step S125). Specifically, the user operates the user interface 40 and selects a file that indicates a print target. The processor 20 acquires, by the function of the acquisition section 21, the file via the communication section 30 based on the output from the user interface 40. Then, the processor 20 records the print data that is described in the file in a RAM or the like.

Furthermore, the processor 20 receives information about an insertion position of the QR code by the function of the output controller 24. Various methods for receiving the insertion position information can be assumed. For example, the processor 20 causes the user interface 40 to display a preview of a document that is indicated by print data. Then, the processor 20 receives a touch operation to the previewed document and acquires insertion position information. In other words, a user can operate the user interface 40 to specify an insertion position.

After the insertion position is specified, the processor 20 draws, by the function of the output controller 24, the print target into which the QR code that has been generated in step S120 is being inserted at the insertion position. Then, the processor 20 causes the print section 10 to print a print product in which the QR code is inserted.

Figure 3:
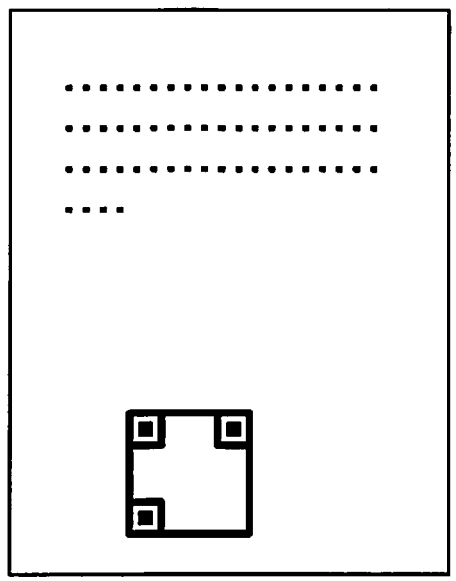
FIG. 3 illustrates an example print result.
Figure 4:
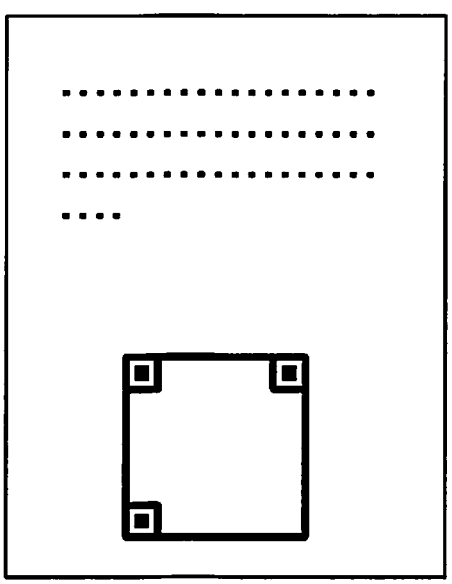
FIG. 4 illustrates an example print result.

With this processing, the print product, which is the document into which the QR code that corresponds to the print condition is being inserted, is printed. FIG. 3 and FIG. 4 illustrate example print products. In the examples in FIG. 3 and FIG. 4, QR codes that have the same output information are inserted into documents that have the same print content respectively. However, print conditions are different in FIG. 3 and FIG. 4; the print condition in FIG. 3 is for printing performed at a quality level higher than that in FIG. 4. For example, in FIG. 3, the print condition C1 in Table 1 is applied and in FIG. 4, the print condition C2 in Table 1 is applied.

In this case, since the print quality in FIG. 3 is higher than that in FIG. 4, even if the same output information is used, the error-correction amount in the QR code in FIG. 3 is smaller than that in the QR code in FIG. 4. Consequently, when the QR code in FIG. 3 is compared with the QR code in FIG. 4, the QR code in FIG. 3 is printed in a smaller size. As described above, in this embodiment, a QR code can be printed in an output size that corresponds to a print condition.

3. Other Embodiments

The above-described embodiment is a mere example, and various other embodiments may be employed. For example, the code conversion apparatus may be a device other than the printer, for example, a computer, a display, or a projector. Furthermore, the apparatus that includes the code conversion apparatus may be, for example, a multifunction peripheral that includes the printing function and other functions such as a scanner function. The code conversion apparatus may be implemented by a single apparatus or a plurality of apparatuses. The technique of outputting a code that has an error-correction amount corresponding to an output condition as described in the above embodiment may be implemented as a program, a method, or a method of producing a print product.

In a case in which various apparatuses function as the code conversion apparatus, the error-correction amount may be various error-correction amounts that correspond to output conditions. For example, when a code is output by displaying the code on a display, the error-correction amount may be changed depending on the display brightness of the display. Such a code conversion apparatus can be applied to any apparatus that has a display.

For example, the user interface 40 that is included in the above-described printer 1 includes the display, accordingly, the printer 1 may function as the code conversion apparatus that causes the display to display a code. In such a case, the processor 20 acquires, by the function of the acquisition section 21, output information to be displayed as a code on the user interface 40. The output information may be various types of information, for example, a uniform resource locater (URL) of a website that includes a functional description of the printer 1.

The processor 20 specifies an output condition for the display on the user interface 40 by the function of the specifying section 22. For example, as output conditions, it is assumed that the output destination is the display and the display condition is the brightness, and the processor 20 specifies the brightness in displaying a code on the display on the user interface 40. The brightness may be determined by various ways, for example, by a user in advance, or depending on the ambient brightness detected by a sensor in the printer 1. In any case, the processor 20 specifies the brightness of the display in displaying a code, that is, the brightness of the code.

In this embodiment, the brightness of the display is the average brightness of the entire display. The brightness of the display may be specified by various ways, for example, may be specified by an upper limit of the brightness of pixels displayed on the display, may be specified by whether or not the setting is set such that bright display is to be provided by gamma correction, or the like, or may be specified by the brightness of a backlight of the display. Alternatively, the brightness of the display may be specified by whether or not the display is in a high dynamic range mode. The brightness may be the brightness of a code, for example, a lightness value of a code (may be a background of a code).

The processor 20 converts, by the function of the conversion section 23, output information into a code that has an error-correction amount that corresponds to a level of the brightness of a display. In this embodiment, when the display brightness level is high, by the function of the conversion section 23, the processor 20 performs a conversion with an error-correction amount smaller than that to be used when the display brightness level is low. The processor 20 generates image data that represents the code acquired by the conversion, for example, in a RAM (not illustrated). In this embodiment, the image data consists of white (saturation lightness value) and black (minimum lightness value).

Table 2 shows an example correspondence relationship between the brightness of a display and error correction capabilities.

TABLE 2

| BRIGHT | C5: LEVEL L (ABOUT 7% RESTORABLE) |
|---|---|
| DARK | C6: LEVEL M (ABOUT 15% RESTORABLE) |

In the example in Table 2, a state in which an index of the brightness of the entire display is greater than or equal to a threshold value is defined as a bright state (output condition C5), and a state in which the index of the brightness is less than the threshold value is defined as a dark state (output condition C6), and a correspondence relationship between the states and error-correction capabilities of a QR code is shown. The threshold value may be determined in advance, for example, so as to prevent excessive increase in the probability of occurrence of reading errors by changing the error-correction capability to be above, equal to, or below the threshold. The correspondence relationship shown in Table 2 is a mere example, and a plurality of threshold values may be provided and the error-correction capability may be changed at the brightness of three or more levels.

Furthermore, the processor 20 causes, by the function of the output controller 24, the display to display a code at a brightness level specified by the function of the specifying section 22. Specifically, the processor 20 causes the user interface 40 to set the brightness of the entire display to the level specified by the function of the specifying section 22. Then, based on image data generated by the function of the conversion section 23, the processor 20 causes the user interface 40 to display a code on the display on the user interface 40.

With the above-described configuration, when the brightness of a display is set to a high brightness level, a code that has a relatively small error-correction amount can be displayed in a small size. On the other hand, when the brightness of the display is not set to a high brightness level, a code that has a relatively large error-correction amount and reduces the occurrence of reading errors can be displayed. Consequently, according to the embodiment, an error-correction amount can be appropriately adjusted depending on the ease of reading corresponding to the brightness of a display.

The above-described printer 1 can output a code both for displaying on the display and printing in the print section 10. In the printer 1, when an error-correction capability that corresponds to an output condition is in the relationship shown in Table 1 and Table 2, the processor 20, by the function of the conversion section 23, when the output condition indicates displaying by a display, converts output information with an error-correction amount smaller than that to be used when the output condition indicates printing by a printer.

Generally, the quality of a code is not substantially reduced in displaying by a display because the code on the display is not affected by ink bleeding, print medium deterioration, and the like that occur in printing by a printer. Accordingly, as in the embodiment, when an output condition indicates displaying by a display, a code is output with an error-correction amount smaller than that to be used when the output condition indicates printing by a printer, and thus, under the display condition in which the quality of the code is not substantially reduced, the code can be displayed without unnecessarily increasing the image size in displaying the image. On the other hand, in printing in which a code is likely to be affected by ink bleeding, an error-correction amount is relatively increased such that the code that can reduce the chance of the occurrence of reading errors can be printed.

In the printer 1, when an error-correction capability that corresponds to an output condition is in the relationship shown in Table 1 and Table 2, the processor 20, by the function of the conversion section 23, when the output condition indicates displaying at a low brightness level, converts output information with a first error-correction amount larger than an error-correction amount to be used when the output condition indicates printing at a high brightness level, and when the output condition indicates printing onto coated paper, converts output information with the first error-correction amount.

Specifically, in the relationship shown in Table 1 and Table 2, the error-correction amount (level M) that corresponds to the output condition C6 for displaying by a display at a low brightness level is larger than the error-correction amount (level L) that corresponds to the output condition C5 for displaying by a display at a high brightness level. Furthermore, the error-correction amount (level M) that corresponds to the print condition C1 for displaying onto coated paper is the same as the error-correction amount that corresponds to the output condition C6 for displaying by a display at a low brightness level. Consequently, the smallest error-correction amount in printing is the same as the largest error-correction amount in displaying. With this configuration, a code can be output without unnecessarily increasing an error-correction amount in displaying by a display and without increasing reading errors in printing, and an error-correction amount applicable to both displaying by a display and printing can be set.

In the above-described embodiments, when an error-correction amount is changed depending on an output condition, the output size of a code is changed. Consequently, from another point of view, this configuration can change the output size of a code depending on an output condition. The output size of a code may be changed with a change in an error-correction amount, or may be changed without a change in an error-correction amount. The latter case includes a configuration in which the output size of a code is increased or reduced depending on an output condition in a state the error-correction amount is constant. The correspondence relationship between an output condition and an image size may include various relationships, for example, when an output quality is bad, the image size may be increased as compared with a case in which the output quality is good.

Figure 5:
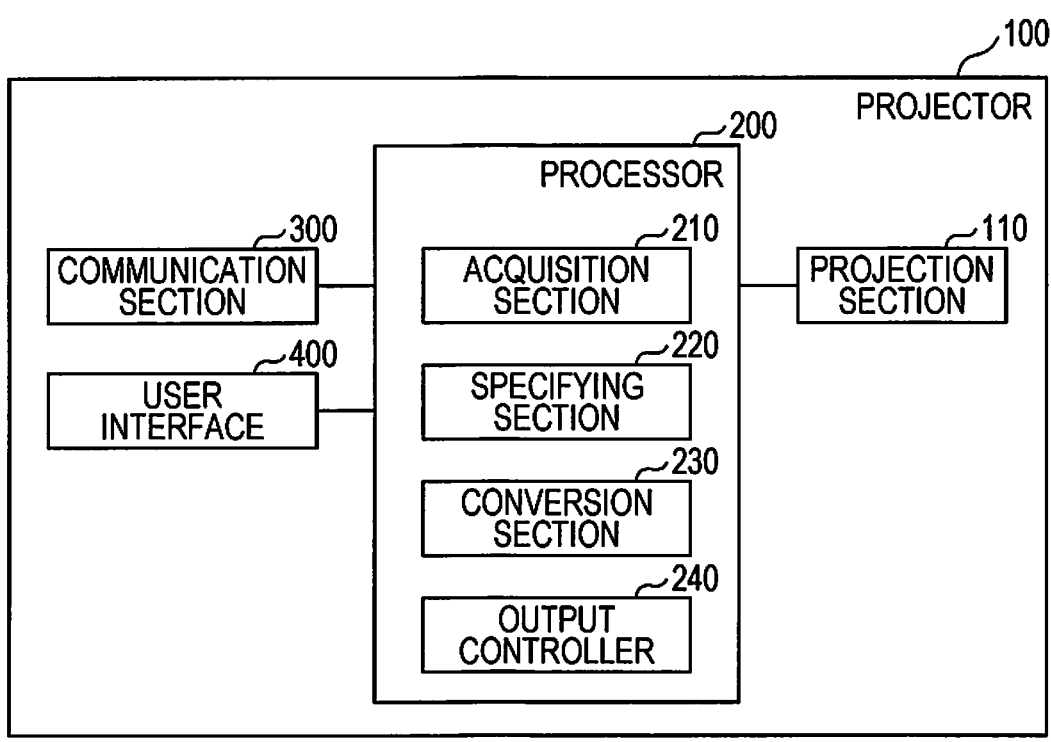
FIG. 5 is a block diagram illustrating a configuration of a projector.

The outputting method may be outputting by a projector. FIG. 5 is a block diagram illustrating a configuration of a projector 100 that includes a code conversion apparatus. The projector 100 includes a projection section 110, a processor 200, a communication section 300, and a user interface 400. The projection section 110 includes a light source, an optical modulator, and an optical system (not illustrated). Transmittance of visible light emitted from the light source is controlled for each pixel by the optical modulator, and the light is output via the optical system. The projector 100 is positioned so as to be able to project the light that is output via the optical system onto a screen, and can display various images on the screen by projecting the projection light onto the screen.

The processor 200 includes a CPU, a ROM, a RAM, and a nonvolatile memory (not illustrated). The CPU can execute a control program that is stored in the ROM or the nonvolatile memory by using the RAM or the nonvolatile memory.

The communication section 300 can communicate with an external device under the control of the processor 200. In this embodiment, from an external device, the processor 200 can acquire an image to be projected and output information about a target to be coded. The user interface 400 has buttons for issuing various instructions to the projector 100 and a display section (light-emitting diode (LED), etc.) for indicating various statuses.

The processor 200, by the functions of an acquisition section 210, a specifying section 220, a conversion section 230, and an output controller 240, can perform processing similar to that in the processor 20 according to the embodiment illustrated in FIG. 1. It should be noted that the embodiment illustrated in FIG. 5 employs the projector and is different from the embodiment illustrated in FIG. 1 in their code output methods, and thus there are some differences.

Specifically, the processor 200 acquires output information by the function of the acquisition section 210. Furthermore, the processor 20, by the function of the specifying section 220, specifies that the output method is projection and specifies a projection condition for the projection section 110, which serves as an output section, as an output condition. In this embodiment, the projection condition is a distance between a projector and a screen. The projection conditions may include other various conditions, for example, resolution, the number of pixels, the type of screen, and ambient brightness.

Furthermore, the processor 200 converts, by the function of the conversion section 230, output information into a code that has an error-correction amount that corresponds to an output condition. In this processing, when an output condition indicates projecting by a projector to a close point, in this embodiment, the processor 200 converts output information with an error-correction amount smaller than that to be used when the output condition indicates projection to a distant point. In other words, in projecting by the projector, as the distance between the projector 100 and a screen becomes farther, blurring tends to occur (the edge tends to become unclear).

Accordingly, in this embodiment, when the distance between the projector 100 and a screen is equal to or shorter than a threshold value (when projection is performed to a close point), the processor 200 converts output information with an error-correction amount smaller than that to be used when the distance between the projector 100 and the screen is longer than the threshold value (when projection is performed to a distant point). With this configuration, when a screen is close and blurring is unlikely to occur, the error-correction amount is reduced and a code can be displayed without unnecessarily increasing the size. On the other hand, when a screen is distant and blurring is likely to occur, the error-correction amount is increased and the code can be displayed without increasing reading errors.

It should be noted that the output information may be acquired in various ways other than the method of acquiring output information from a file. Output information that is expressed by characters, numerics, or the like may be received in accordance with an operation to the user interface 40, or output information that is input via an external device (computer, etc.) may be received via the communication section 30, or output information may be a status (including setting contents and abnormal information) of the apparatus itself. Furthermore, output information may be acquired from a nonvolatile memory in the apparatus, for example, a telephone number of the manufacturer's support center that a user should contact when an abnormal condition occurs may be acquired as the output information.

The acquisition section can acquire output information. Specifically, as the output information, the acquisition section can acquire information about a target to be converted into a code. The output information may be various kinds of information such as numerics or characters. There are no limitations on the ways of expression such as the number of bits and numerical notation (binary, decimal, etc.) and also on the character identification methods (character code etc.).

The specifying section can specify an output condition for the output section. Specifically, for the output section that outputs a code, the specification section can specify an output condition that corresponds to the output section. For example, when the output section is a print section, output conditions may include various conditions such as the type of print medium to be used, print resolution, the type of recording material (ink, toner, etc.) and color, which can provide different print results for the same print target. When the output section is a display or a projector, output conditions may include various conditions such as the brightness and color of the display, the brightness and color of an image to be displayed, the resolution of the display, and the type of display (liquid crystal, organic EL, etc.), which can provide different display results for the same display target.

The output conditions may be dynamically changed or fixed. The output conditions may be specified in various ways, for example, based on a detection result in the output section, or by a user's input.

The conversion section can convert output information into a code that has an error-correction amount that corresponds to an output condition. Specifically, the conversion section converts output information into a code, and in this processing, adds error-correction information to the output information by a predetermined method that corresponds to the type of code. The error-correction information may be various types of information amounts that correspond to respective error-correction capabilities. The conversion section can convert output information into a code that has an error-correction amount that corresponds to an output condition. An error-correction amount is determined to correspond to an output condition, and the error-correction amount that corresponds to the output condition may be fixed in advance, may be specified by a user, or may be determined depending on the importance of the output information. Specifically, an error-correction amount may be increased or reduced by a user, or if output information is important, the error-correction amount may be increased and if the output information is not important, the error-correction amount may be reduced and the error-correction amount may be further increased or reduced depending on the output condition.

The output controller can cause the output section to output a code under an output condition specified by the specifying section. For example, when the output section is a print section, the output controller may cause the print section to print a code under a specified condition, and when the output section is a display or a projector, the output controller may cause the display or the projector to display a code under a specified condition. It should be noted that the output target may include an object other than the code, for example, various characters and images may be output together with the code. Furthermore, the type of code is not limited. For example, the code is not limited to the two-dimensional code, and a one-dimensional code may be used. The error-correction amount is not limited to the error-correction amount that is determined by the specification of the code and information for error correction may be added to output information and the information may be coded.

What is claimed is:

1. An output product producing method comprising:
acquiring output information;
specifying an output condition for an output section; and
when the output condition indicates displaying by a display, converting the output information into a code having an error-correction amount smaller than the error-correction amount to be used when the output condition indicates printing by a printer.

2. The output product producing method according to claim 1, wherein when the output condition indicates displaying by a display at a high brightness level, converting the output information with the error-correction amount smaller than the error-correction amount to be used when the output condition indicates displaying at a low brightness level.

3. The output product producing method according to claim 1, wherein when the output condition indicates projecting by a projector to a close point, converting the output information with the error-correction amount smaller than the error-correction amount to be used when the output condition indicates projection to a distant point.

4. The output product producing method according to claim 1, wherein when the output condition indicates printing onto coated paper, converting the output information with the error-correction amount smaller than the error-correction amount to be used when the output condition indicates printing onto uncoated paper.

5. The output product producing method according to claim 1, wherein when the output condition indicates printing with a genuine ink, converting the output information with the error-correction amount smaller than the error-correction amount to be used when the output condition indicates printing with non-genuine ink.

6. The output product producing method according to claim 1, wherein
when the output condition indicates displaying by the display at a high brightness level, converting the output information with the error-correction amount smaller than the error-correction amount to be used when the output condition indicates printing onto coated paper, and
when the output condition indicates displaying by the display at a low brightness level, converting the output information with the error-correction amount equal to the error-correction amount to be used when the output condition indicates printing onto coated paper.

7. The output product producing method according to claim 1, further comprising:
causing the output section to output an output product including the code;
collecting a status of the output section; and
acquiring the status as the output information.

8. An output product producing method comprising:
acquiring output information;
specifying an output condition for an output section;
converting the output information into a code; and
when the output condition indicates displaying by a display, causing the display to display an output product including the code having an error-correction amount smaller than the error correction amount to be used when the output condition indicates printing by a printer.

9. A non-transitory storage medium storing a code conversion program, the program causing a computer to execute processing comprising:
acquiring output information;
specifying an output condition for an output section;
converting the output information into a code; and
when the output condition indicates displaying by a display, causing the display to display an output product including the code having an error-correction amount smaller than the error correction amount to be used when the output condition indicates printing by a printer.

* * * * *